(12) United States Patent
Norman et al.

(10) Patent No.: US 7,013,157 B1
(45) Date of Patent: Mar. 14, 2006

(54) METHOD FOR MULTICAST DELIVERY WITH DESIGNATED ACKNOWLEDGMENT

(75) Inventors: Stuart Norman, Don Mills (CA); Douglas Smith, Stouffville (CA)

(73) Assignee: Cisco Technology, Inc., San Jose, CA (US)

( * ) Notice: Subject to any disclaimer, the term of this patent is extended or adjusted under 35 U.S.C. 154(b) by 406 days.

(21) Appl. No.: 10/161,334

(22) Filed: Jun. 3, 2002

(51) Int. Cl.
*H04B 15/00* (2006.01)

(52) U.S. Cl. .............. 455/503; 455/502; 455/518; 455/517; 455/519; 455/500; 370/350; 370/503; 370/465; 709/231; 709/230

(58) Field of Classification Search .......... 455/503, 455/90.2, 575.1, 550, 556, 502, 18, 7, 518, 455/517, 519, 500; 713/178; 370/350, 503, 370/465; 709/231, 230
See application file for complete search history.

(56) References Cited

U.S. PATENT DOCUMENTS

| | | | | |
|---|---|---|---|---|
| 5,457,808 A | * | 10/1995 | Osawa et al. | 455/8 |
| 5,530,918 A | * | 6/1996 | Jasinski | 340/7.25 |
| 5,905,871 A | * | 5/1999 | Buskens et al. | 709/245 |
| 6,175,571 B1 | * | 1/2001 | Haddock et al. | 370/423 |
| 6,223,286 B1 | * | 4/2001 | Hashimoto | 713/178 |
| 6,243,587 B1 | * | 6/2001 | Dent et al. | 455/456.2 |
| 6,349,210 B1 | | 2/2002 | Li | |
| 6,370,142 B1 | * | 4/2002 | Pitcher et al. | 370/390 |
| 6,392,993 B1 | * | 5/2002 | Hamilton et al. | 370/230 |
| 6,501,957 B1 | * | 12/2002 | Muhonen et al. | 455/503 |
| 6,567,851 B1 | * | 5/2003 | Kobayashi | 709/228 |
| 6,577,873 B1 | * | 6/2003 | Kim et al. | 455/503 |
| 6,633,765 B1 | * | 10/2003 | Maggenti | 455/503 |
| 6,647,020 B1 | * | 11/2003 | Maher et al. | 370/432 |
| 2002/0058493 A1 | * | 5/2002 | Ikeda et al. | 455/403 |
| 2002/0102999 A1 | * | 8/2002 | Maggenti et al. | 455/518 |
| 2003/0032391 A1 | * | 2/2003 | Schweinhart et al. | 455/12.1 |
| 2003/0073453 A1 | * | 4/2003 | Basilier | 455/503 |
| 2003/0143982 A1 | * | 7/2003 | Wolters et al. | 455/414 |
| 2003/0153280 A1 | * | 8/2003 | Kopp et al. | 455/90 |
| 2004/0132448 A1 | * | 7/2004 | Torres et al. | 455/427 |
| 2004/0196917 A1 | * | 10/2004 | Toshimitsu | 375/260 |
| 2004/0248579 A1 | * | 12/2004 | Fukui et al. | 455/450 |
| 2004/0252701 A1 | * | 12/2004 | Anandakumar et al. | 370/395.21 |
| 2005/0030885 A1 | * | 2/2005 | Langley et al. | 370/205 |

* cited by examiner

*Primary Examiner*—Sonny Trinh
*Assistant Examiner*—Khai Nguyen
(74) *Attorney, Agent, or Firm*—Tucker Ellis & West LLP

(57) ABSTRACT

A packet format for multicast messages which designates a single receiver to send an acknowledgment to the multicast message. The designated receiver responds to the multicast message with an acknowledgment. If the designated receiver does not respond to the multicast message, the message is resent. The resent message may designate a different receiver for acknowledging the message.

31 Claims, 4 Drawing Sheets

METHOD FOR MULTICAST DELIVERY WITH DESIGNATED ACKNOWLEDGMENT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention is generally related to wireless broadcast transmissions and more particularly to a method for providing an increased level of assurance for multicast packet delivery.

2. Description of the Related Art

Group transmissions are typically used to deliver a message to a group of receivers simultaneously. A group packet is any packet wherein the address is a multidestination address, associated with one or more stations on a given network. The type of group includes, but is not limited to, a multicast group or a broadcast group. The designation of which group is to receive the message is ordinarily identified by the MAC sublayer address of the packet. A multicast group address is an address associated by higher-level convention with a group of logically related stations. A broadcast address is a distinguished, predefined multicast address that always denotes the set of all stations on a given LAN. This group is predefined for each communication medium to consist of all stations actively connected to that medium; it is used to broadcast to all the active stations on that medium. All stations are able to recognize the broadcast address. It is not necessary that a station be capable of generating the broadcast address.

Typically, an Access Point sends a multicast transmission after waiting a specified amount of time for a channel to be clear. Normally the message is sent once and there is no mechanism for determining if any receiver actually received the message. The multicast package may be lost due to a collision with another transmission, or due to bit errors caused by interference or channel noise.

One approach to increasing the reliability of multicast messages has been to send the multicast message to each receiver individually. As each receiver receives the message, it sends an acknowledgment. While this method improves delivery of the message, a major disadvantage is that it uses up an enormous amount of bandwidth because of all of the additional traffic generated by resending the same message numerous times, the time waiting for an acknowledgment for each transmission, and the time required for each acknowledgment to be transmitted. For example, if there are N stations, then each broadcast/multicast packet must be sent N times, and N acknowledgments must be transmitted. Each directed broadcast packet must also be retransmitted if the acknowledgment is not received.

Thus, there exists a need for a method that can improve the reliability of group message delivery with low bandwidth requirements.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, the invention contemplates a new packet format for group addressed messages. A group addressed message includes, but is not limited to a multicast or broadcast message. The present invention identifies a designated acknowledger for each group packet. When the packet is transmitted, the transmitter waits for the designated acknowledger to acknowledge the message by sending an Acknowledgment Packet ("ACK") to the original transmitter of the group packet. If the acknowledger does not respond, then the packet is retransmitted. The retransmitted group packet may designate a new acknowledger in case the old acknowledger is no longer active or is inoperative.

In one embodiment, additional data is appended to the group packet that will indicate a designated acknowledger. Upon receipt of the group packet, the designated acknowledger will transmit an ACK to the original group transmitter. If the ACK is not received, then the group message is retransmitted.

In another embodiment of the present invention, it is contemplated that the address of the designated acknowledger is used in an unused address space of the packet. For example, in the 802.11 specification, the Address4 field is only needed to identify the original source of Wireless Distribution System frames, and is thus unused and available for use for other types of frames.

In yet an alternative embodiment of the present invention, it is contemplated that the transmitter of the multicast message may transmit both original multicast and new multicast packets to maintain compatibility for nodes not supporting the new format. For example, in an 802.11 network, messages are sent as packets. When sending a message utilizing a new format with a designated acknowledger, an older legacy receiver may not recognize the new packet. So by having the transmitter send the message once with the old packet format and again with the packet format of the present invention, compatibility with legacy receivers is maintained while enhanced receivers enjoy the benefit of a higher level of reliability. It should also be noted that the "enhanced" receivers must also detect and discard potential duplicate multicast/broadcast packets.

Finally, to help reduce the chance of collisions, media reservation packets, for example 802.11 RTS/CTS, which can be exchanged between the transmitter and the designated acknowledger, could precede the group packet. This will disable transmission by other radio nodes that receive the media reservation exchange, and thus reduce the chance of a collision when the actual broadcast/multicast packet is sent.

It is contemplated that the method of the present invention can be implemented with standard hardware and software.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

This the drawings.

DETAILED DESCRIPTION OF INVENTION

The present invention contemplates a new packet format for a group addressed packet that utilizes an additional field to indicate a designated acknowledger. The designated acknowledger will transmit an Acknowledgment (ACK) packet to the original transmitter. If the ACK is not received, then the group message is retransmitted. The retransmission may designate a new acknowledger in case the old acknowledger has left the cell. In some protocols, for example 802.11, the cell could send both the original group packet and the group packet of the present invention to maintain compatibility for nodes not supporting the new format.

Figure 1:
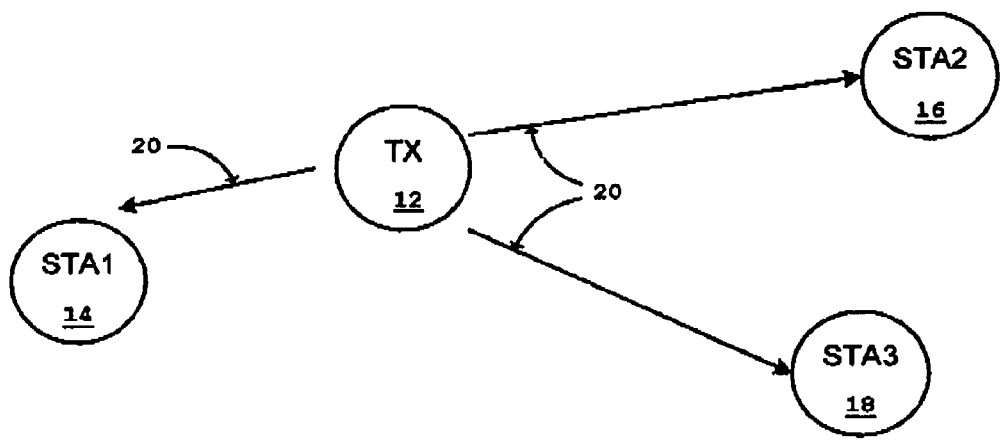
FIG. 1 is a block diagram illustrating a group message being sent to all stations simultaneously.

Referring to the drawings and in particular FIG. 1, there is shown a cell generally designated 10. The cell is comprised of the station, TX 12, typically an access point, that is sending a group packet The cell 10 further comprises three stations, STA1, 14, STA2, 16, and STA3, 18. The destination of the packet is shown by lines 20, which in the case of the group packet is from TX 12, to STA1 14, STA2 16, and STA3 18.

Figure 2:
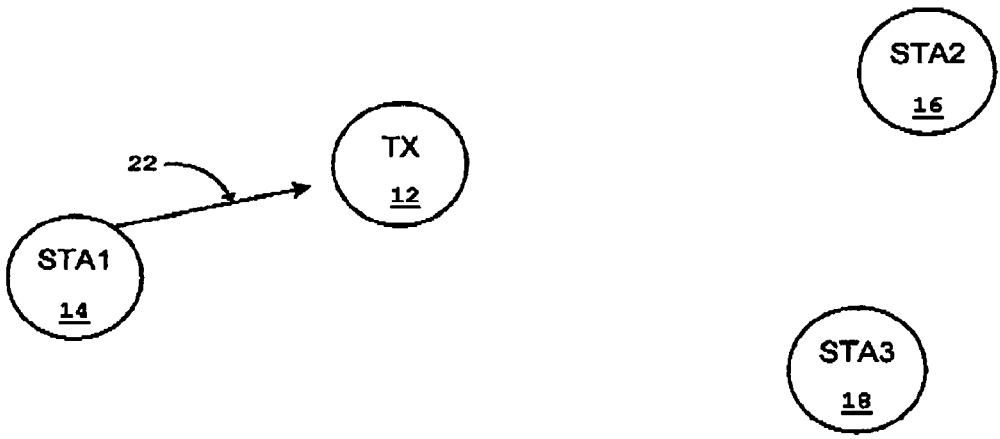
FIG. 2 is a block diagram illustrating a response being sent back to the originator of a group message.
Figure 3:
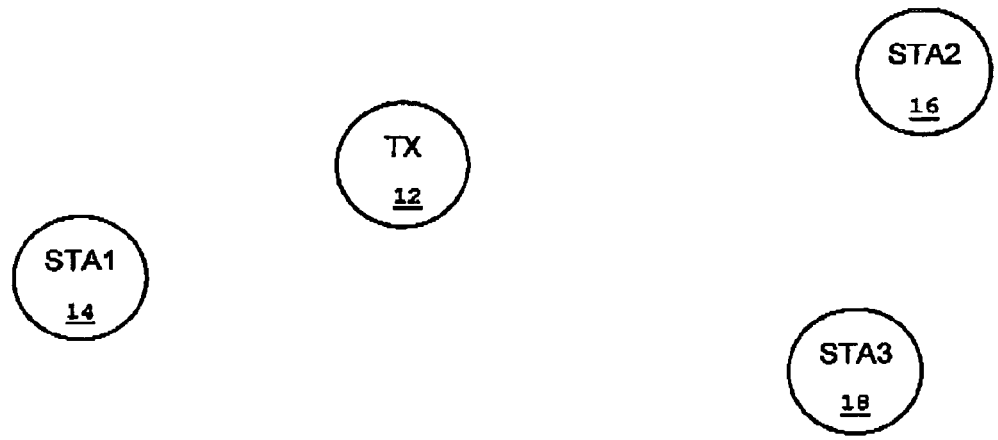
FIG. 3 is a block diagram illustrating the situation where a designated acknowledger sends no response after a group message is sent.
Figure 4:
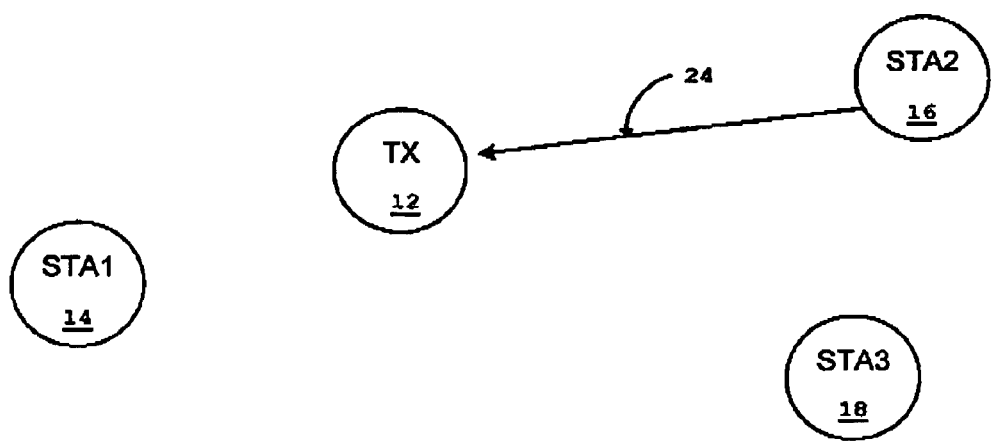
FIG. 4 is a block diagram showing the situation wherein an alternate designated acknowledger responds to a group message.

As shown in FIG. 2, if the group packet designated STA1 14 as the designated acknowledger, then upon receipt of the group packet STA1 transmits an ACK from STA1 to TX 12 along path 22. If the designated acknowledger does not receive the message, then as shown in FIG. 3, the cell remains clear, that is no ACK is returned to TX 12. When no ACK is received by TX 12, then the packet is again transmitted as shown in FIG. 1; however, a new acknowledger, such as STA2 16 can be designated. As shown in FIG. 4, when the new designated acknowledger, STA2 16, receives the message, the ACK is sent along path 24 back to TX 12.

Figure 5:
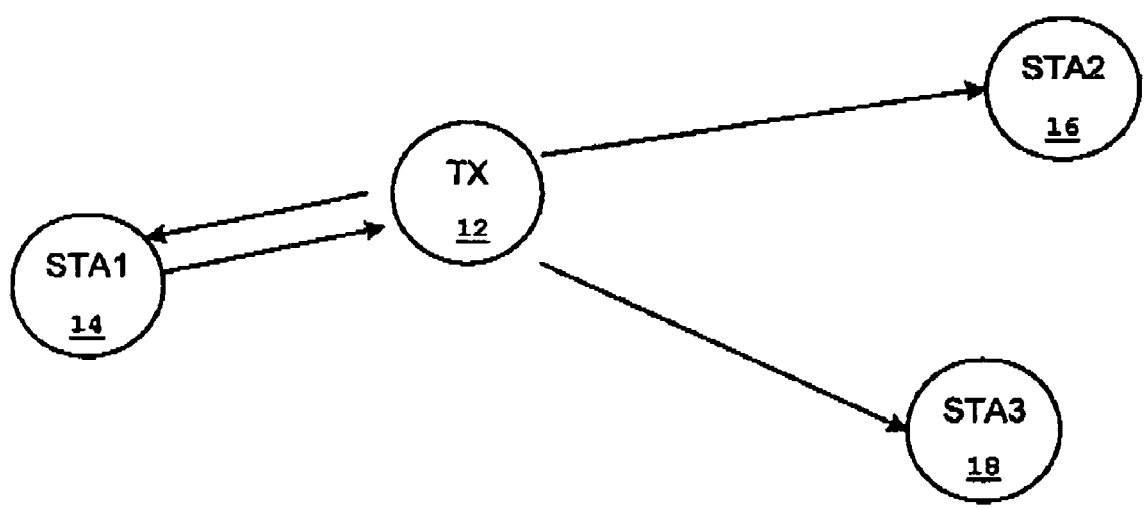
FIG. 5 is a block diagram showing the condition wherein a group message is sent while another station is simultaneously transmitting a message

In FIG. 5, TX 12 sends a group packet at the same time STA1 14 is sending a packet which results in a collision. Depending on which station is the designated acknowledger, there are several possible outcomes. If STA1 14 is the designated acknowledger, then it will not respond to the group packet because of the collision. However, in the case of STA2 16 or STA3 being the designated acknowledger, TX 12 may receive an ACK as these stations may or may not be affected by the collision. If TX 12 does receive an ACK, then the group packet will not be retransmitted and thus never received by STA1 14. Therefore, to further assure all of the nodes within the cell 10 receive the group packet then TX 12 can utilize a media reservation method prior to sending the group packet. Several methods for reserving the media are well known in the art, including, but not limited to utilizing RTS/CTS which can be exchanged between sender and the designated acknowledger. Utilizing media reservation prior to sending the group packet will disable transmission by other nodes that "hear" the media reservation exchange, and thus reduce the chance of a collision when the actual group packet is transmitted.

Figure 6A:
FIG. 6a is a block diagram of a typical wireless packet.

FIG. 6a illustrates a typical group packet 60. The packet 60 typically contains a header 62 and the payload 64 or actual data. A frame check sequence field 66, cyclic redundancy code ("CRC"), checksum, or other similar type of field is often appended at the end of the packet so that the recipient can verify the packet was received correctly. However, the frame check sequence field 66 is not required. For some packets, a field in the header may be utilized to designate the message and hence the payload 64 may be eliminated from the packet 60.

Figure 6B:
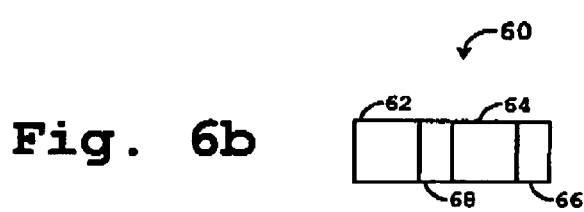
FIG. 6b is a block diagram of a wireless packet with an added field for designating an acknowledger inserted in the header of the packet.

FIG. 6b shows an alternative embodiment wherein the designated acknowledger address field 68 is appended to the header 62 of the packet. As shown in FIG. 6b, the header field 62 and the payload 64 have not changed in size. However, in cases where the packet size is limited or fixed, it is contemplated that at least one of the header 62, payload 64 and frame check sequence 66 will have to be adjusted to compensate for the designated acknowledger address field 68.

Figure 6C:
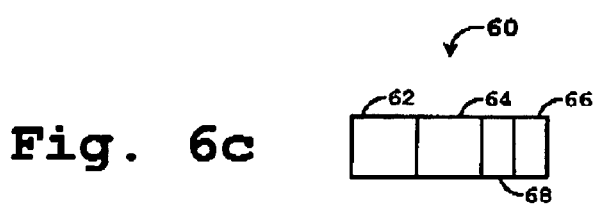
FIG. 6c is a block diagram of a wireless packet with an added field for designating an acknowledger appended to the end of the packet.

In FIG. 6c, the designated acknowledger address field 68 is inserted after the payload 64. While in FIG. 6c as in FIG. 6b the field sizes of the address 62, payload 64, and frame check sequence 66 fields have not changed, it is contemplated that in cases where the packet size is limited or fixed that at least one of the header 62, payload 64 and fame check sequence 66 will have to be adjusted to compensate for the designated acknowledger address field 68.

Figure 6D:
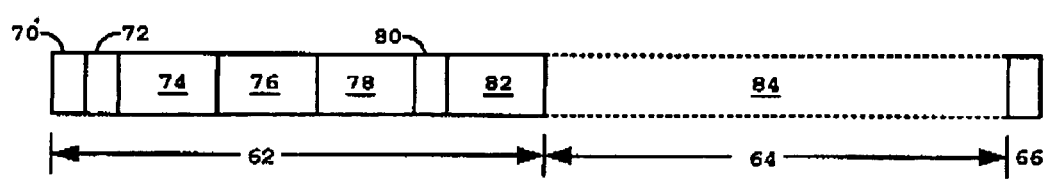
FIG. 6d is a block diagram of an 802.11 packet.

FIG. 6d is a representation of a typical 802.11 data frame. Beginning on the left, the frame comprises a frame control field 70 that is two bytes long, a duration ID field 72 that is 2 bytes long, a first address field 74 that is six bytes long, a second address field 76 that is six bytes long, a third address field 78 that is six bytes long, a sequence control field 80 that is two bytes long, an optional fourth address field 82 that is six bytes long, the frame body or payload 84 that varies from zero to two thousand three hundred and twelve bytes in length, and the frame check sequence field 66. The header 62 of this packet consists of the frame control field 70, the duration ID field 72, the first address field 74, the second address field 76, the third address field 78, the sequence control field 80, and the fourth address field 82. Normally, the first address field 74 contains the receiver address while the second address field 76 contains the transmitter address. The fourth address field 82 is only needed to identify the original source of Wireless Distribution System frames and therefore is often available for use by the method of the present invention. By using the fourth address field 82 to designate an acknowledger, the present invention may allow for compatible operation with legacy and standard nodes as they would normally ignore four-address packets with a multicast/broadcast receiver address1.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A method for sending a group message, comprising:
   sending a packet, the packet having a multidestination address associated with a plurality of stations on a network, and a single destination address associated with a single station of the plurality of stations and designating the single station as a designated acknowledger;
   waiting for an acknowledgment from the designated acknowledger;
   receiving an acknowledgment from the designated acknowledger;
   creating a second version of the group packet, the second version of the group packet formatted in a legacy format that does not contain the single station address to designate a station to respond; and
   sending the second version of the group packet.

2. The method of claim 1, wherein the waiting step waits for a preset time, and upon expiration of the preset time, the method further comprising:
   re-sending the packet; and
   waiting for an acknowledgment from the designated acknowledger.

3. The method of claim 2, wherein the re-sending step further comprises, changing the designated acknowledger to another one of the plurality of stations on the network.

4. The method of claim 1 wherein the packet is a multicast packet.

5. The method of claim 1, wherein the packet is a broadcast packet.

6. The method of claim 1, wherein the single station address is appended to the packet.

7. The method of claim 1, wherein the packet comprises a header section and the single station address is appended to the header section of the packet.

8. The method of claim 1, wherein the packet comprises a header section and the single station address is inserted into an unused portion of the header section.

9. The method of claim 1, the sending step further comprising reserving the channel prior to sending the packet.

10. The method of claim 1, wherein the multidestination address is one of the group consisting of a broadcast address and a multicast address and the single destination address is an unicast address.

11. A method for sending a group message, comprising:
    creating a packet, the packet having a multidestination address associated a plurality of stations on a network and a single station address associated with a single station of the plurality of stations, the multidestination address selected from the group consisting of a multicast address and a broadcast address, and the single station address designating the single station as a designated acknowledger station to send an acknowledgment upon the designated acknowledger's receipt of the packet;
    sending the packet;
    waiting for an acknowledgment from the designated acknowledger; and
    re-sending the packet when an acknowledgment from the designated acknowledger is not received after waiting a predetermined time interval.

12. The method of claim 11, wherein the single station address is appended to the packet.

13. The method of claim 11, wherein the packet comprises a header section and the single station address is inserted into an unused portion of the header section.

14. The method of claim 11, wherein the re-sending step further comprises, changing the single station address of the designated acknowledger to another one of the plurality of stations on the network.

15. A method of claim 11, further comprising,
    creating a second version of the group packet, the second version of the group packet formatted in a legacy format and that does not designate a station to respond; and
    sending the second version of the group packet.

16. The method of claim 11 the sending step further comprising reserving the channel prior to sending the packet.

17. A computer readable medium of instructions, comprising
    means for creating a packet, the packet having a multi-destination address associated with a plurality of stations on a network, and a single station address designating a one of the plurality of stations as a designated acknowledger station responsive to send an acknowledgment upon receipt of the packet;
    means for sending the packet;
    means for waiting for an acknowledgment from the designated acknowledger; and
    means for receiving an acknowledgment from the designated acknowledger;
    wherein the multidestination address is one of the group consisting of a broadcast address and a multicast address and the since destination address is an unicast address.

18. The computer readable medium of instructions of claim 17, wherein the waiting step waits for a preset time, and upon expiration of the preset time, the method further comprising:
    means for re-sending the packet; and
    means for waiting for an acknowledgment from the designated acknowledger.

19. A computer system comprising:
    A computer software product that includes a medium readable by a processor, the medium having stored thereon:
    a first sequence of instructions which, when executed by said processor causes said processor to create a packet, the packet having a multidestination address associated with at a plurality of stations and a single station address designating a one of the plurality of stations as a designated acknowledger for the packet, the designated acknowledger responsive to send an acknowledgment upon the designated acknowledger's receipt of the packet;
    a second sequence of instructions which, when executed by said processor causes said processor to send the packet;
    a third sequence of instructions which, when executed by said processor causes said processor to wait for an acknowledgment from the designated acknowledger; and a fourth sequence of instructions which, when executed by said processor causes said processor to receive an acknowledgment from the designated acknowledger.

20. The computer system of claim 19, wherein the third sequence of instructions waits for a preset time, and upon expiration of the preset time, the third sequence of instructions comprising:
instructions which, when executed by said processor causes said processor to re-send the packet; and
instructions which, when executed by said processor causes said processor to wait for an acknowledgment from the designated acknowledger.

21. A computer program product having a computer readable medium having computer program logic recorded thereon for sending a group packet comprising:
means for creating a packet, the packet having a multi-destination address associated with a plurality of stations on a network and a single station address associated with a selected one of the plurality of stations, designating the selected one of the plurality of stations as a designated acknowledger, responsive to send an acknowledgment upon the designated station's receipt of the packet;
means for sending the packet;
means for waiting for an acknowledgment from the designated acknowledger; and
means for receiving an acknowledgment from the designated acknowledger;
wherein the multidestination address is one of the group consisting of a broadcast address and a multicast address and the single destination address is an unicast address.

22. The computer program product of claim 21, wherein the means for waiting for an acknowledgment waits for a preset time, and upon expiration of the preset time, the means further comprising:
means for re-sending the packet; and
means for waiting for an acknowledgment from the designated acknowledger.

23. A method for sending a group message, comprising:
creating a frame, the frame having a multidestination address associated with a plurality of stations on a network and a single station address associated with a one of the plurality of stations, the single station address designating the one of the plurality of stations a designated acknowledger station, the designated acknowledger station responsive to send an acknowledgment upon the designated acknowledger's receipt of the frame;
sending the frame;
waiting for an acknowledgment from the designated acknowledger; and
receiving an acknowledgment from the designated acknowledger;
re-sending the frame; and
waiting for an acknowledgment from the designated acknowledger;
wherein the re-sending step four comprises, changing the single station address of the designated acknowledger to another of the plurality of stations on the network; and
wherein the frame has four address fields and the address of the designated acknowledger station isolated in the fourth address field.

24. A method for sending a group message, comprising:
sending a packet, the packet having a multidestination address associated with a plurality of stations on a network, and a single destination address associated with a single station of the plurality of stations and designating the single station as a designated acknowledger;
waiting for an acknowledgment from the designated acknowledger; and
receiving an acknowledgment from the designated acknowledger;
wherein the multidestination address is one of the group consisting of a broadcast address and a multicast address and the single destination address is an unicast address.

25. The method of claim 24, wherein the waiting step waits for a preset time, and upon expiration of the preset time, the method further comprising:
re-sending the packet; and
waiting for an acknowledgment from the designated acknowledge.

26. The method of claim 25, wherein the re-sending step further comprises, changing the designated acknowledger to another one of the plurality of stations on the network.

27. The method of claim 24, wherein the single station address is appended to the packet.

28. The method of claim 24, wherein the packet comprises a header section and the single station address is appended to the header section of the packet.

29. The method of claim 24, wherein the packet comprises a header section and the single station address is inserted into an unused portion of the header section.

30. The method of claim 24, further comprising,
creating a second version of the group packet, the second version of the group packet formatted in a legacy format that does not contain the single station address to designate a station to respond; and
sending the second version of the group packet.

31. The method of claim 24, the sending step further comprising reserving the channel prior to sending the packet.

* * * * *